3,086,664
CARRIAGE HOLDER
Virgle S. Gribble, P.O. Box 461, Gold Hill, Oreg.
Filed Apr. 24, 1961, Ser. No. 104,965
6 Claims. (Cl. 214—1)

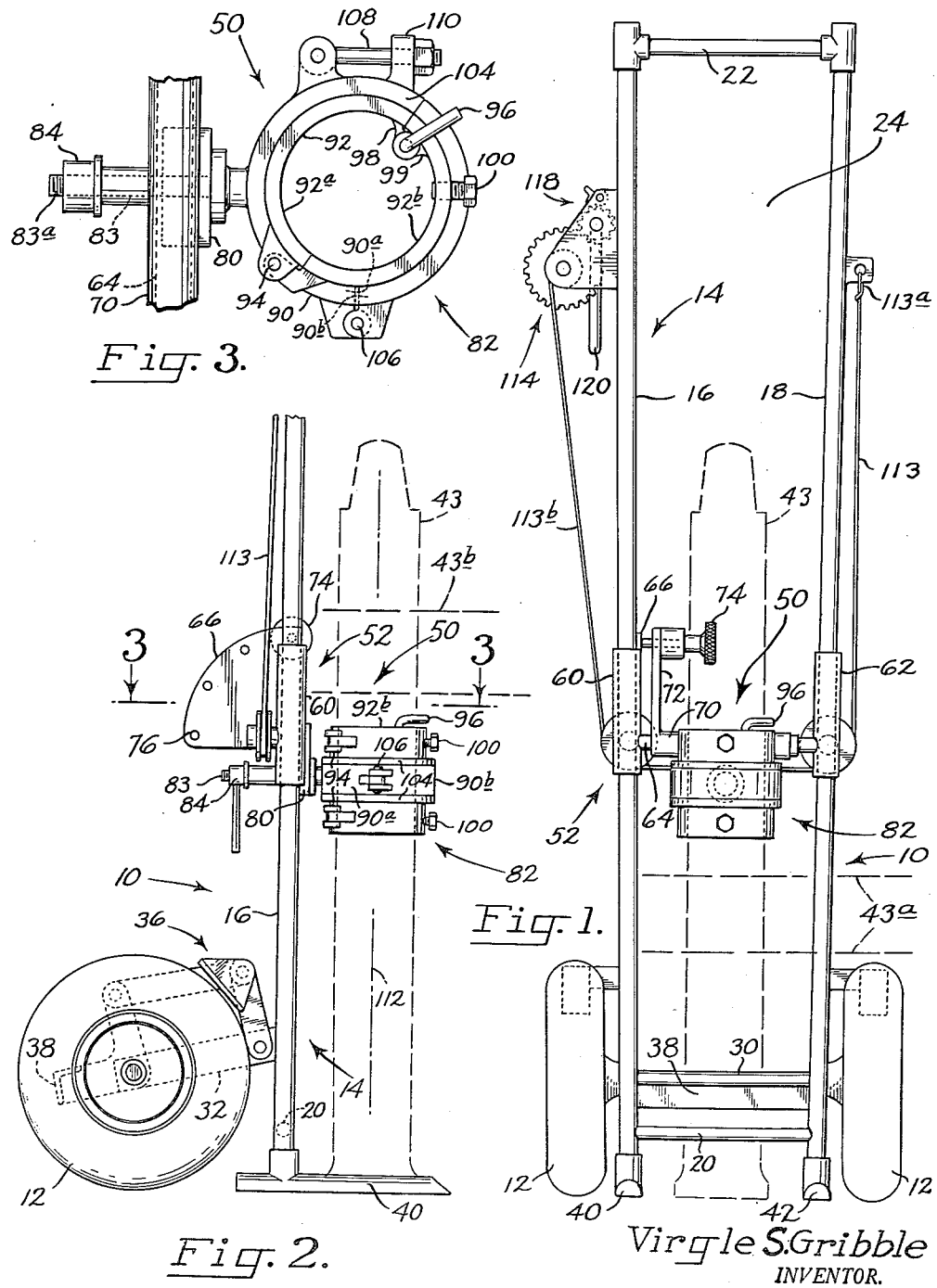

This invention relates to wheel-supported devices that have clamp mechanisms included in the device for holding onto an object. The wheel-supported device of this invention features clamp mechanism positionable in a novel manner in various positions, whereby the object held thereby can be placed in like positions. The invention has particular utility in connection with the handling of elongated objects, such as drilling bits and other tools, which periodically must be hard faced, sharpened, and/or repaired in other ways.

A general object of the invention is to provide an improved type of wheel-supported holder, in the form of a cart with clamp mechanism readily positioned thereon to accommodate easy loading and unloading of such objects as elongated drilling bits, such cart being useful in transporting an object to a service area, and holding the object while repair work is performed thereon.

The usual drilling bit is relatively long, and may include screw threads at the top thereof for attaching it to a drilling stem. On the withdrawing of a drilling bit from a well bore, the drilling bit assumes a vertical position at the end of the drilling stem. The holder of this invention may be rolled up to the bit, then secured to the bit, and afterwards, because of the novel construction of the holder, the bit may be unscrewed from the stem, shifted to a position on the holder facilitating its transport to a service area, moved by the holder to a service area, and then shifted to a position on the holder best facilitating repair operations to be performed on the bit.

Another object of the invention, therefore, is to provide a device which can perform the above functions in a practical and satisfactory manner, with resulting greater efficiency in the handling of such tools as drilling bits.

Another object is to provide a novel type of clamp mechanism for a device of the type contemplated, with a mounting for the clamp mechanism accommodating positioning of the clamp mechanism in a multitude of positions.

A further object is to provide clamp mechanism that includes tool holding means used in actually holding onto a tool, such as a bit, such means being journaled in the clamp mechanism so as to be rotatable about an axis substantially paralleling the longitudinal axis of the tool held thereby.

Other objects and advantages of the invention will become more fully apparent, as the following description is read in conjunction with the accompanying drawings, wherein:

FIG. 1 is a front elevation of the tool holder;
FIG. 2 is a side elevation of portions of the tool holder in FIG. 1; and
FIG. 3 is a cross-sectional view, somewhat enlarged, taken along the line 3—3 in FIG. 2.

Referring now to the drawings, in the embodiment of the invention illustrated the device takes the form of a hand truck, and includes a frame, generally indicated at 10, with lateral support wheels 12 provided the base of frame 10 whereby the same can be moved over the ground.

Frame 10 comprises an upright section 14, defined by a pair of spaced uprights 16, 18 that in the position of the cart in FIGS. 1 and 2 extend substantially vertically up from the ground. The uprights are secured together adjacent their bottom set of ends by a bar 20, and connecting their top set of ends a brace 22 may be provided. The space 24 between the uprights is clear between bar 20 adjacent the bottom set of ends of the uprights and brace 22 adjacent the top set of ends of the uprights. As will become more fully apparent hereinbelow, this space is utilized to accommodate swinging of an object held by the holder to positions facilitating the performance of repair operations thereon.

Support wheels 12 are located to the rear of upright section 14, and provide rear support for the section with the holder in the position of FIGS. 1 and 2. The wheels are journaled on the ends of an axle 30, such axle being held at the rear of section 14 by struts 32 that project rearwardly of the uprights and are fixed, one to each of the uprights. A foot brake mechanism, generally indicated at 36, and actuated by a brake bar 38, may be provided for controlling movement of the carriage, as when going down an incline with a heavy load, etc.

At the base of uprights 16, 18, and extending forwardly from the uprights, are forks 40, 42. These forks have disconnected forward ends, and are secured at their rear ends to the uprights, one to each upright. Because of the disconnected forward ends of the forks, the cart may be rolled in an inclined position up to a drilling bit, such as bit 43, with the base of such bit near the ground, and the cart may then be swung to a vertical position, with the forks swinging downwardly to assume a horizontal position, while positioning themselves on either side of the bit. The forks, since they extend forwardly of the uprights at their bottom set of ends, provide forward support for the uprights with the cart in the upright position of FIGS. 1 and 2.

Disposed above the space between the forks, and used for clamping onto a drilling bit, is tool holder mechanism, indicated generally at 50. This is mounted on uprights 16 and 18, through the intermediary of a carriage indicated at 52. The carriage is vertically shiftable on the uprights, to enable adjustment in the elevation of any bit held by the tool holder mechanism.

Specifically, considering the structure of carriage 52, 60, 62 indicate a pair of sleeves encircling and slidable on uprights 16, 18, respectively. The sleeves are interconnected by a rod 64 secured at its ends to the sleeves. Secured to one sleeve and extending rearwardly from it is a plate 66.

Tool holder mechanism 50 comprises a tube 70 encircling rod 64. Secured to tube 70 is an arm 72. On rotation of the tube about rod 64, arm 72 swings with its outer end describing an arc. The outer end of arm 72 carries a screw 74, and the end of screw 74 fits into an indent 76 provided in plate 66 when the arm and tube are swung in a counterclockwise direction in FIG. 2 to a selected position. Tightening of screw 74 serves to secure the arm and tube in a selected position. Tube 70 and rod 64 constitute pivot means in the construction accommodating pivotal movement about a horizontal pivot axis extending transversely of uprights 16, 18.

Depending from tube 70 and part of carriage 52 is a bracket 80 which supports clamp mechanism 82 of tool holder mechanism 50. Clamp mechanism 82 has a stud 83 projecting to the rear thereof, which is journaled in bracket 80, and the clamp mechanism and stud are rotatable relative to the bracket about a horizontal axis extending from the rear of the front of upright section 14. The stud and bracket constitute swivel mechanism accommodating swinging of clamp mechanism 82 about the horizontal axis. Stud 83 is provided with a threaded end portion 83a on which a nut 84 is mounted. On tightening of nut 84, the stud and clamping mechanism 82 may be locked in a selected position with respect to carriage 52.

Considering now the construction of clamp mechanism 82, 90 indicates a mounting, and within the mounting is a holding means 92. Holding means 92 comprises sections 92a, 92b hinged together at 94. The sections when swung together as in FIG. 3 are connected together by a pin 96 extending through sections 98, 99 having aligning bores that receive the pin with sections 92a, 92b swung together. Tightening screws 100 are provided in section 92b, with inner ends that protrude through the section and contact a drilling bit when the same is mounted within holding mean 92. By screwing screws 100 into section 92b, a drilling bit is clamped in place. Around the perimeter of holding means 92 there is an annular groove defined by spaced annular shoulder 104.

Mounting 90 comprises halves 90a, 90b pivoted together at 106. These halves when swung together as in FIG. 3 fit within the annular groove defined between shoulders 104. The halves may be secured together in this position, by swivel screw 108 pivotally connected to half 90a, that fits within a notch provided in ear 110 integral with half 90b. With sections 92a, 92b of the holding means connected together about a drilling bit, and halves 90a, 90b of the mounting connecting together about holding means 92, the holding means is rotatable within mounting 90 about a vertical axis 112 that extends upwardly from between the forks. The axis of rotation is between and in front of uprights 16, 18, such axis approximately coinciding with the longitudinal axis of drilling bit 43.

Hoist mechanism is provided for moving the carriage and the clamp mechanism up and down on uprights 16, 18. Thus, a line or cable is indicated at 113, and has an end 113a secured to the top end of upright 18. The other end 113b of cable 113 is trained over the drum of a winch 114. Pawl and ratchet mechanism 118 locks the drum of winch 114 from paying out cable 113. A handle 120 is provided for turning the winch drum.

Explaining now the holder and how it may be used, it will be assumed that a drilling stem and bit have been raised from a well bore, to place the bit above ground. With the drilling bit raised, the holder is wheeled in an inclined position to the side of the bit, and swung to a vertical position, with forks 40, 42 coming down on either side of the drilling bit. Clamp mechanism 82 is then opened up, after which holding means 92 is secured about the bit, and mounting 90 is secured about means 92. In this condition of the parts, the drilling bit may be rotated about a vertical axis coinciding with its longitudinal axis, because of the fact that means 92 is journaled within mounting 90. Such rotation of the bit may be used to unscrew it from the drilling stem, thus to remove the bit from the stem.

If the holder is now backed off from beside the drilling stem, the drilling bit may be swung to various positions prior to moving it to a service area. If, for instance, it is desired to place the bit lower to the ground, so as to make for easier wheeling of the bit over the ground, the bit can be swung to a horizontal position and then lowered, to place it in the position indicated in dashed outline in FIG. 1 at 43a. This lowers the center of gravity of the loaded cart. On reaching a service area, and it now being desired to place the bit in a stable position for repair work, the carriage and bit may be raised and the bit swung so that it extends in a horizontal direction between the uprights (the position indicated in dashed outline in FIG. 2 at 43b). The fact that the uprights are spaced apart and the space between them is clear enables the bit to the positioned in this manner. In this horizontal position of the bit, maximum stability is provided by the forks and wheels. Of course, if desired, the bit can be placed in other positions than the ones just specifically described.

Having repaired the bit, it may then easily be shifted into a lowered position where it extends transversely across the front of the uprights, to ready it for transport. On reaching the drilling site, the bit may then be raised, turned to a vertical position, and screwed into place on a drilling stem.

It should be obvious that the device of the invention has several advantages, and it should be obvious that these advantages are possible with structures somewhat different from the one described. Various modifications and variations are possible, and it is desired to cover all modifications and variations that would be apparent to one skilled in the art, and that come within the scope of the appended claims.

It is claimed and desired to secure by Letters Patent:

1. A wheel-supported tool holder comprising an upright frame with wheel support therefor, a carriage mounted for vertical movement along said frame, and tool holder mechanism mounted on said carriage, said tool holder mechanism including pivot means accommodating pivoting of the tool holder mechanism about a horizontal axis extending transversely of said frame, swivel mechanism accommodating swinging of the holder mechanism about a horizontal axis extending from the rear to the front of the upright frame, holding means for holding a tool constructed to be clamped about a tool thus to hold it, and means journaling said holding means in said tool holder mechanism with the holding means rotatable about a vertical axis extending substantially perpendicular to said swivel axis.

2. A hand truck comprising, with the truck in upright position, a frame having a pair of laterally spaced uprights extending vertically up from the ground, a pair of laterally spaced support wheels connected to said frame disposed to the rear of said uprights and enabling rolling of the hand truck with said uprights tilted, a pair of spaced ground-engaging forks with disconnected forward ends extending forwardly from the base of said uprights, one connected to each, and providing stationary forward support for said uprights, a carriage mounted on said uprights for vertical movement up therealong, means for positioning said carriage at various elevations on said uprights, clamp mechanism disposed in front of said uprights and above the space between said forks, and means mounting said clamp mechanism on said carriage, said means including swivel mechanism enabling said clamp mechanism to be swung about a substantially horizontal axis extending from the rear to the front of said uprights, and pivot mechanism enabling swinging of the clamp mechanism about a horizontal axis extending transversely of said uprights, said clamp mechanism including holding means rotatably mounted therein and rotatable about a vertical axis spaced between said forks and in front of and between said uprights.

3. The hand truck of claim 2, wherein said means for positioning the carriage at various elevations on said uprights comprises a line and winch, said line having one end attached to the upper end of one of said uprights and its other end secured to said winch, said winch being mounted on the upper end of the other of said uprights, and pulley means mounted on said carriage, an intermediate portion of said line being trained over said pulley means.

4. A holder for elongated articles comprising; an upright frame and means for supporting it in an upright position; a carriage mounted for vertical movement on said frame; clamp mechanism; and means mounting said clamp mechanism on said carriage; said last mentioned means including swivel mechanism whereby the clamp mechanism may be swung about a substantially horizontal axis extending from the rear to the front of said frame, and pivot means enabling swinging of the clamp mechanism about a horizontal axis extending transversely of said frame; said clamp mechanism including holding means for holding said article and constructed to encircle said article between its ends when holding on to the same, a mounting supporting said holding means between its ends, and means journaling said holding means in said mounting.

5. A hand truck for articles comprising, with the truck in upright position, a frame having a pair of laterally spaced uprights extending vertically up from the ground, a pair of laterally spaced support wheels connected to said frame rearwardly of said uprights and enabling rolling of the hand truck when said uprights are tilted, a pair of ground-engaging forks with disconnected forward ends extending forwardly from the base of said uprights one connected to each, and providing non-rolling forward support for said uprights, a carriage, means mounting the carriage on said uprights for vertical movement therealong, means for securing said carriage in various positions on said uprights, clamp mechanisms disposed in front of said uprights and above the space between said forks, and means mounting said clamp mechanism on said carriage, said last-mentioned means including swivel mechanism enabling said clamp mechanism to be swung about a substantially horizontal swivel axis extending from the rear to the front of said uprights, means for securing said clamp mechanism from movement about said swivel axis, pivot means enabling swinging of said clamp mechanism about a horizontal pivot axis extending transversely of said uprights, and means for securing said clamp mechanism from movement about said pivot axis, said clamp mechanism including holding means for holding onto an article journaled for rotation about an axis perpendicular to said swivel axis.

6. A holder for an elongated article comprising an upright frame and means for supporting it in an upright position, a carriage mounted for vertical movement on said frame, clamp mechanism, and means mounting said clamp mechanism on said carriage including pivot means enabling swinging of the clamp mechanism about a horizontal axis, said clamp mechanism including a mounting swingable with the clamp mechanism about said horizontal axis, holding means for holding said article and constructed substantially to encircle said article between its ends when holding on to the same, and means journaling said holding means in said mounting whereby an article held therein may be rotated about its longitudinal axis.

References Cited in the file of this patent
UNITED STATES PATENTS

| | | |
|---|---|---|
| 1,591,766 | Mayer | July 6, 1926 |
| 2,521,695 | Davis | Sept. 12, 1950 |
| 2,603,368 | Vance | July 15, 1952 |
| 2,831,589 | Way | Apr. 22, 1958 |
| 2,926,879 | Dietrich | Mar. 1, 1960 |